United States Patent
Niemela

(10) Patent No.: US 9,984,215 B2
(45) Date of Patent: May 29, 2018

(54) OBTAINING PASSWORD DATA

(71) Applicant: F-Secure Corporation, Helsinki (FI)

(72) Inventor: Jarno Niemela, Helsinki (FI)

(73) Assignee: F-Secure Corporation, Helsinki (FI)

(*) Notice: Subject to any disclaimer, the term of this patent is extended or adjusted under 35 U.S.C. 154(b) by 10 days.

(21) Appl. No.: 14/070,754

(22) Filed: Nov. 4, 2013

(65) Prior Publication Data

US 2014/0137220 A1    May 15, 2014

(30) Foreign Application Priority Data

Nov. 13, 2012   (GB) ................................. 1220402.0

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| G06F 21/31 | (2013.01) |
| G06F 21/60 | (2013.01) |

(52) U.S. Cl.
CPC ............ *G06F 21/31* (2013.01); *G06F 21/604* (2013.01); *H04L 63/083* (2013.01); *G06F 2221/2115* (2013.01)

(58) Field of Classification Search
CPC ..... G06F 21/31; G06F 21/604; H04L 63/083; H04L 9/3226; H04L 29/06755; H04L 29/06782; H04W 12/06; H04N 21/4753; G10H 2240/101
See application file for complete search history.

(56) References Cited

U.S. PATENT DOCUMENTS

| | | | | |
|---|---|---|---|---|
| 6,243,816 B1* | 6/2001 | Fang | ....................... | G06F 21/41 |
| | | | | 707/999.009 |
| 2003/0130957 A1* | 7/2003 | Best et al. | ....................... | 705/72 |
| 2003/0159071 A1* | 8/2003 | Martinez | ................. | G06F 21/31 |
| | | | | 726/8 |
| 2004/0168068 A1 | 8/2004 | Goal et al. | ..................... | 713/184 |
| 2004/0193925 A1 | 9/2004 | Safriel | ........................ | 713/202 |
| 2007/0039042 A1* | 2/2007 | Apelbaum | ....................... | 726/6 |

(Continued)

OTHER PUBLICATIONS

Mannan et al., Passwords for both Mobile and Desktop Computers: ObPwd for Firefox and Android, Jul. 12, 2012.*

*Primary Examiner* — Trong Nguyen
(74) *Attorney, Agent, or Firm* — Harrington & Smith

(57) ABSTRACT

A method of obtaining password data for entry to an application running on a device. The method may include running a password manager application on a device. The password manager application may identify one or more applications installed on the device. The password manager application may display the identified applications on a display of the device. The password manager application may receive a user selection of a displayed application. The password manager application may determine whether an entry exists for the selected application in a memory associated with the password manager application. If no entry exists, the password manager application may generate an entry comprising password data for the selected application. If an entry exists, the password manager application may retrieve password data relating to the selected application.

11 Claims, 3 Drawing Sheets

(56) References Cited

U.S. PATENT DOCUMENTS

| | | | |
|---|---|---|---|
| 2007/0050295 A1* | 3/2007 | Kilby | G06Q 30/02 705/51 |
| 2008/0046983 A1* | 2/2008 | Lester | G06F 21/31 726/5 |
| 2008/0201768 A1* | 8/2008 | Koo | G06F 21/34 726/6 |
| 2010/0017616 A1 | 1/2010 | Nichols et al. | 713/183 |
| 2011/0145915 A1* | 6/2011 | Gnech et al. | 726/19 |
| 2011/0307946 A1* | 12/2011 | Hilerio et al. | 726/7 |
| 2012/0246714 A1* | 9/2012 | Ma | H04L 9/3226 726/16 |
| 2013/0005488 A1* | 1/2013 | Evans et al. | 463/43 |
| 2013/0042310 A1* | 2/2013 | Najafi | G06F 21/31 726/7 |
| 2013/0076774 A1* | 3/2013 | Yu et al. | 345/589 |
| 2013/0198823 A1* | 8/2013 | Hitchcock et al. | 726/6 |
| 2014/0109200 A1* | 4/2014 | Tootill | G06F 21/32 726/5 |

\* cited by examiner

OBTAINING PASSWORD DATA

TECHNICAL FIELD

The invention relates to methods and apparatus for obtaining password data for entry to an application running on a computer device.

BACKGROUND

As used herein, the term "password data" encompasses any data that is secret or specific to a user and that may be used to protect sensitive information. The term password data encompasses an actual password, but may also include other login data such as a user name or an answer to a security question. Password data should not be limited to, although they can comprise, text comprising a string of alphanumeric characters. For example, passwords may additionally or alternatively comprise visual or image data, sound (e.g. voice) data or biometric data.

Passwords, log-in details and other secret information (collectively termed "password data" from now on for the sake of clarity) are of great importance for restricting access to modern "on-line" systems, for accessing secure information (e.g. a PIN for accessing a bank account) and for conducting secure communications and note taking.

A problem exists in that users may access an online account from a number of different devices and it may become burdensome to continually have to enter password data each time an online account is accessed. Additionally, the security of online accounts may be reduced as users may register an account with simple password data or identical password data to another online account in order to reduce this burden.

SUMMARY

According to an aspect of the invention, there is provided a method of obtaining password data for entry to an application running on a device. The method may comprise running a password manager application on a device. The password manager application may identify one or more applications installed on the device. The password manager application may display the identified applications on a display of the device. The password manager application may receive a user selection of a displayed application. The password manager application may determine whether an entry exists for the selected application in a memory associated with the password manager application. If no entry exists, the password manager application may generate an entry comprising password data for the selected application. If an entry exists, the password manager application may retrieve password data relating to the selected application.

Optionally, identifying the one or more applications comprises determining one or more applications running on the device.

Optionally, displaying the one or more applications comprises sorting the determined applications such that applications running on the processor are presented most prominently.

Optionally, the password manager application obtains application information for the selected application.

Optionally, the password manager application determines the application information from application metadata relating to the selected application and stored on a memory of the device.

Optionally, the password manager application communicates over a network to a server to obtain the application information.

Optionally, generating the entry comprises automatically generating password data.

Optionally, the automatically generated password data comprises predetermined default password data.

Optionally, the password manager application copies the generated or retrieved password data to a clipboard for pasting into the selected application.

Optionally, the selected application is running on the processor, the method further comprising the password manager application entering the password data into the selected application.

Optionally, the device is a hand-held mobile device.

According to an aspect of the invention, there is provided a non-transitory computer readable medium comprising computer readable code configured to carry out any of the methods described above.

According to an aspect of the invention, there is provided a password manager application embodied on a non-transitory computer readable medium. The application may comprise code for identifying one or more applications installed on a device. The application may comprise code for presenting the identified applications on a display of the device. The application may comprise code for receiving a user selection of a displayed application. The application may comprise code for determining whether an entry exists for the selected application in a memory associated with the password manager application. If no entry exists, the application may comprise code for generating an entry for the selected application. If an entry exists, the application may comprise code for retrieving password data relating to the selected application.

According to an aspect of the invention, there is provided a system for obtaining password data for entry to an application running on a device. The system may comprise a device configured to run a password manager application. The password manager application may run on a processor of the device. The password manager application may be configured to identify one or more applications installed on the device. The password manager application may be configured to display the identified applications on a display of the device. The password manager application may be configured to receive a user selection of a displayed application. The password manager application may be configured to determine whether an entry exists for the selected application in a memory associated with the password manager application. If no entry exists, the password manager application may be configured to generate an entry comprising password data for the selected application. If an entry exists, the password manager application may be configured to retrieve password data relating to the selected application.

According to an aspect of the invention, there is provided a method of obtaining password data for entry to an application running on a computer device. The method may comprise running a password manager application on the device. The password manager application may determine one or more applications that are installed on the device. The password manager application may display the determined one or more applications to a user. The password manager application may receive a user selection of a displayed application. Based on the selected application, the password manager application may obtain password data for entry into the selected application.

Optionally, obtaining password data comprises checking a database associated with the password manager application to determine whether an entry for the selected application is stored therein.

Optionally, obtaining password data further comprises, if an entry is stored in the password manager database for the selected application, retrieving password data from the password manager database.

Optionally, obtaining password data further comprises, if no entry is stored in the password manager database for the selected application, generating and storing a new entry comprising password data in the password manager database for the selected application.

According to an aspect of the invention, there is provided a system for obtaining password data for entry to an application running on a computer device. The system may comprise a device configured to launch a password manager application. The password manager application may be configured to determine one or more applications that are installed on the device. The password manager application may be configured to display the determined one or more applications to a user. The password manager application may be configured to receive a user selection of a displayed application. Based on the selected application, the password manager application may be configured to obtain password data for entry into the selected application.

BRIEF DESCRIPTION OF THE DRAWINGS

Exemplary embodiments of the invention are described herein with reference to the accompanying drawings, in which.

DESCRIPTION

The inventors have appreciated that it would be advantageous to reduce the amount of typing required by a user to enter password data to access an online account. This has the advantage of reducing the complexity of a user's interactions with an application running on a device. For example, a user may be able to access an online account via an application using only a single digit and with a minimum number of keystrokes. An additional advantage is that security of online accounts may be increased as a user is more inclined to use complicated (and more secure) password data if the user is not required to type such data every time an online account is accessed.

A specific category of software applications called "password managers" provide a secure means to store password data. Password data can be retrieved in an on-demand basis. Typically, password manager applications store password data entries in a database, which is protected by a master password. A user may access password data stored by a password manager and relating to a specific online account by launching the password manager application and searching for the correct password data. However, the inventors have appreciated that, in order to do this, a user must enter some sort of search term in order to search the password manager database. Commonly, the search term is a text string identifying the online account.

Figure 1:
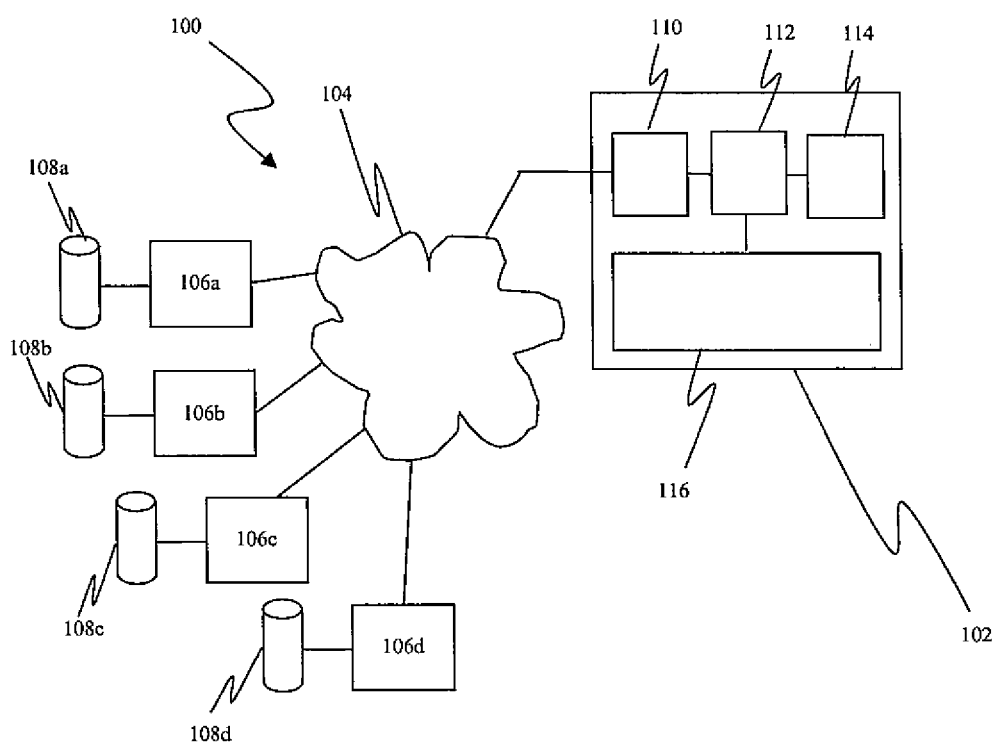
FIG. 1 is a schematic diagram of a system for obtaining password data for entry to an application running on a device.

FIG. 1 shows a system 100 for obtaining password data for entry to an application running on a device 102. The system 100 comprises the device 102 that is in electrical communication with a network 104. The network may be a WAN or LAN, an intranet or the Internet. The system 100 further comprises a plurality of servers 106a-d in electrical communication with the network 104 and also in electrical communication with databases 108a-d configured to store data. In certain exemplary systems, the servers 106a-c and databases 108a-c are configured to store online account data and access to those servers 106a-c and databases 108a-c is restricted by password data. The online account data for each of the servers 106a-c and databases 108a-c may be related to an application that is used to access the online account. The server 106d and database 108d may be configured to store password data for access by a password manager.

The device 102 comprises a network interface 110, which is configured to transmit data to the network 104 and receive data from the network 104. The network interface is in electrical communication with a processor 112, which may be configured to run a password manager application and an application for accessing an online account in accordance with the methods described herein. The processor 112 is in electrical communication with a memory 114, which may comprise a runtime memory for operation in support of applications running on the processor 112 and a data storage memory that may store data for use in one or more applications. The processor 112 is also in electrical communication with a user interface 116, which may be configured to present information to a user and/or receive inputs from a user. The user interface 116 may comprise audio visual equipment such as a display and speakers. The user interface 116 may be a touchscreen to allow user input.

Figure 2:
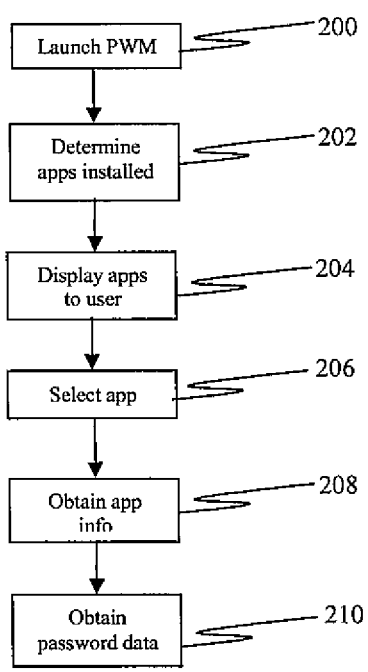
FIG. 2 is a flow diagram of a method for obtaining password data for entry to an application running on a computer device.

FIG. 2 shows a flow diagram of a method for obtaining password data for entry to an application running on a computer device 102.

A password manager application is launched 200 on the processor 112 of the device 102. Typically, the password manager application is stored in the memory 114. The password manager comprises a database, which may be stored locally at the device 102 on the memory 114, or may be stored at a remote server 106d and database 108d that is in electrical communication with the device 102 via the network 104.

The password manager is configured to determine 202 one or more applications that are installed on the device 102. The one or more applications are displayed 204 to the user via the user interface 116. In exemplary methods and apparatus, the applications may be displayed to the user in a list that may be scrolled. The password manager is therefore configured to scan the memory 114 to retrieve data relating to the applications stored thereon.

The data retrieved from the memory 114 may comprise information relating to whether an application is currently running on the device 102. This information may be used to sort the applications installed on the device 102 into those that are running and those that are not running. The applications that are running may be displayed in such a way that the user sees those applications most prominently. For example, the applications that are running may be displayed highest in the list of applications. In a specific example, the password manager may sort the most recently run application to be most prominently displayed, e.g. at the top of the list.

The user selects 206 from the displayed applications the application for which password data is to be obtained.

The password manager application obtains 208 application information relating to the selected application. The information may comprise metadata available from the application itself and providing details of the application. What information is available depends on the operating system, but typically the metadata may include at least: the application name; the application version; and/or the application vendor name. The application information may be one or more of a service name, an application name or a URL of the server and database hosting the online account. The application information may be contained in the application metadata that is stored in the memory 114 when the application is installed on the device 102. In this case, the password manager is configured to obtain the application information from the metadata. Alternatively or in addition, the password manager may be configured to obtain the application metadata from a sever 106*a-c* and database 108*a-c* relating to the selected application.

The password manager then obtains 210 password data relating to the selected application. The obtained password data may be entered into the selected application in order to access an online account.

Figure 3:
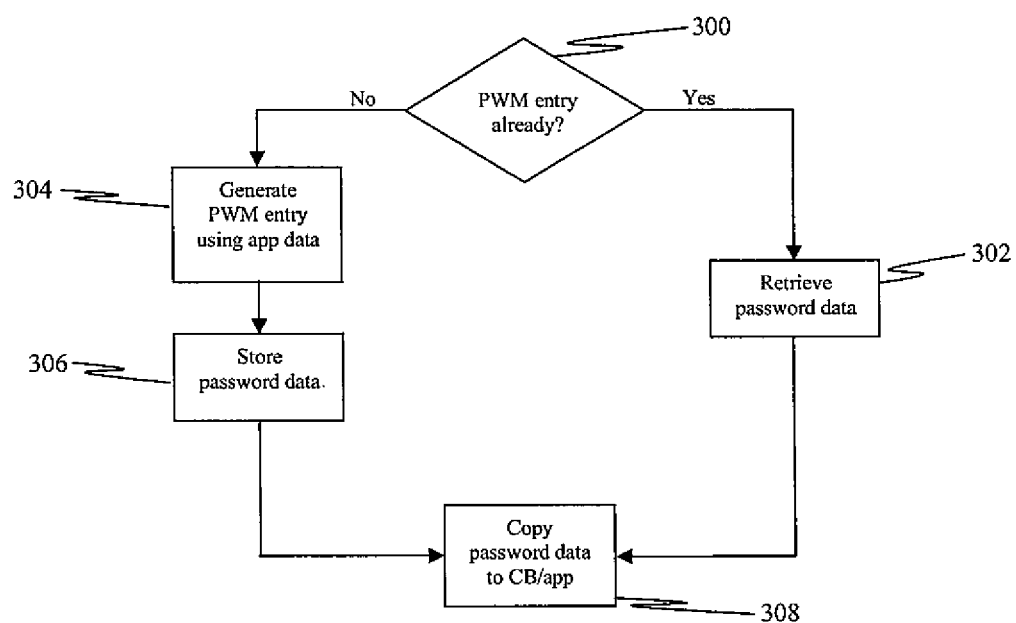
FIG. 3 is a flow diagram of a method for obtaining password data.

FIG. 3 shows a flow diagram relating to obtaining the password data. The obtained application information is used by the password manager running on the processor 112 to determine 300 whether a password manager entry already exists for the selected application. In addition, exemplary methods and apparatus may check a server and/or a local database to determine whether an application is associated with some other user account from another application. For example the "Flipboard" application for use with Android or iOS may be provided with a user's "Twitter" account information so that it may retrieve tweets coming to the user.

If an entry exists, the password data is retrieved 302 from the password manager database.

If no entry exists, then the password manager may generate 304 a new entry using the application data obtained at step 208. The newly generated password manager entry comprises new password data, such as a login and password. The password manager may automatically generate the password data for the new password manager entry. The automatically generated password data may be generated from predetermined default password data stored within the password manager. Alternatively, the password manager may prompt the user to enter suitable password data. Whilst user entry of password data does involve some typing by the user, the automatic generation of the password manager entry using the obtained application data means that the user is not required to enter such data manually, thereby reducing the typing required.

The password data, whether retrieved from an existing entry or generated as part of a new entry, may be copied 306 to a clipboard ready for pasting into an application. In this way, a user is able to obtain password data and enter it into an application without having to type anything. Alternatively or in addition, the obtained password data may be copied 308 directly into a running application and the user therefore does not need even to paste the password data.

Broadly speaking, exemplary methods and apparatus provide a password manager that lists all applications installed on a device, letting a user select an application for which password data is required. Relevant application information may then be retrieved either from a server and database or from application metadata. The application information may be used to obtain stored password data or to generate and obtain new password data.

This means that, instead of having to enter application information to a password manager, a user just has to select the application from the list and then obtain password data for copying to a clipboard for pasting into the registration/login dialog of the selected application.

Particular exemplary methods and apparatus may be especially advantageous when deployed in hand-held mobile devices. Typically, typing is more difficult and takes longer on mobile devices than on laptop and desktop PCs and any reduction in the amount of typing is therefore advantageous. As used herein, a "hand-held mobile device" encompasses electronic devices that may be carried by a user. Hand-held mobile devices may be operated while being held in the hand of the user. Exemplary hand-held mobile devices include tablet PCs, smart phones and mobile phones. Generally, a hand-held mobile device may be any mobile device that does not incorporate a hardware keyboard.

In an exemplary use of the methods and apparatus disclosed herein, a user may wish to register an online account for the first time. The user launches on a device 102 an application that provides access to an online account. For example, the application may provide access to a social media site, such as Facebook or Twitter, or may provide access to an email account or a bank account. When the registration dialog box of the application appears, the user launches the password manager. The password manager determines a list of applications and displays the list to the user. The list may comprise applications that are currently running on the device 102. Additionally, the list may comprise applications that are installed on the device 102. In a specific exemplary method, the list may comprise the application most recently opened. The user selects an application from the list. The password manager obtains application information and generates a new entry in the password manager database. The password manager also stores new password data to the password manager database against the new entry for the selected application. The new password data may be automatically generated, or may be input by the user. The new password data is either copied to a clipboard and the user pastes the password data into the registration dialog box, or, if the application allows it, the password manager may copy the password data directly into the registration dialog box.

In another exemplary use of the methods and apparatus disclosed herein, a user may wish to login to an existing online account, the password data for which is stored in the password manager database. The user launches on a device 102 an application that provides access to the online account. When the login dialog box of the application appears, the user launches the password manager. The password manager determines a list of applications as set out above and displays the list to the user. The user selects an application from the list. The password manager obtains application information and searches the password manager database to obtain the password data relating to the selected application. The password data is either copied to a clipboard and the user pastes the password data into the login dialog box, or, if the application allows it, the password manager may copy the password data directly into the login dialog box.

In a specific exemplary method in which the device 102 uses the Android operating system, the password manager displays password and/or username copy buttons to Android notification. Alternatively, the password manager may display quick buttons to get the password data to the clipboard.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A method of obtaining password data for entry to an application running on a mobile device, the method comprising:
running a password manager application on the mobile device, the password manager application:
identifying automatically one or more applications running on the mobile device prior to the password manager application being launched, the identified one or more applications require the password data;
scanning a memory of the mobile device to retrieve data relating to the identified one or more applications;
displaying the identified one or more applications on a display of the mobile device based on the retrieved data;
receiving a user selection of a displayed application from the displayed one or more applications;
obtaining application information for the selected application;
determining whether an entry exists for the selected application in a memory associated with the password manager application;
responsive to the determination indicating that no entry exists for the selected application in the memory associated with the password manager application, generating an entry comprising new password data for the selected application using the obtained application information;
responsive to the determination indicating that an entry exists for the selected application in the memory associated with the password manager application, retrieving existing password data relating to the selected application;
entering the new password data or the existing password data into the selected application; and
transmitting the new password data or the existing password data over a network to access an online account.

2. A method according to claim 1, wherein the displaying the identified one or more applications comprises sorting the identified one or more applications such that applications running on the mobile device are presented highest in a list of the identified one or more applications.

3. A method according to claim 1, wherein the password manager application determines the application information from application metadata relating to the selected application and the application metadata being stored on the memory of the mobile device.

4. A method according to claim 1, wherein the password manager application communicates over a network to a server to obtain the application information.

5. A method according to claim 1, wherein the generating the entry comprises automatically generating the new password data.

6. A method according to claim 5, wherein the automatically generated new password data comprises predetermined default password data.

7. A method according to claim 1, further comprising the password manager application copying the new password data or the existing password data to a clipboard for pasting into the selected application.

8. A method according to claim 1, wherein the mobile device is a hand-held mobile device.

9. A non-transitory computer readable medium embodying computer executable instructions comprising:
- code for running a password manager application on a mobile device;
- code for identifying automatically one or more applications running on the mobile device prior to the password manager application being launched, the identified one or more applications require password data;
- code for scanning a memory of the mobile device to retrieve, data relating to the identified one or more applications;
- code for displaying the identified one or more applications on a display of the mobile device based on the retrieved data;
- code for receiving a user selection of a displayed application from the displayed one or more applications;
- obtaining application information for the selected application;
- code for determining whether an entry exists for the selected application in a memory associated with the password manager application;
- code for, responsive to the determination indicating that no entry exists for the selected application in the memory associated with the password manager application, generating an entry comprising new password data for the selected application using the obtained application information;
- code for, responsive to the determination indicating that an entry exists for the selected application in the memory associated with the password manager application, retrieving existing password data relating to the selected application;
- code for entering the new password data or the existing password data into the selected application; and
- code for transmitting the new password data or the existing password data over a network to access an online account.

10. A password manager application embodied on a non-transitory computer readable medium of a mobile device and comprising:
- code for identifying automatically one or more applications running on the mobile device prior to the password manager application being launched, the identified one or more applications require password data;
- code for scanning a memory of the mobile device to retrieve data relating to the identified one or more applications;
- code for presenting the identified one or more applications on a display of the mobile device based on the retrieved data;
- code for receiving a user selection of a displayed application from the presented one or more applications;
- obtaining application information for the selected application;
- code for determining whether an entry exists for the selected application in a memory associated with the password manager application;
- code for, responsive to the determination indicating that no entry exists for the selected application in the memory associated with the password manager application, generating an entry comprising new password data for the selected application using the obtained application information;
- code for, responsive to the determination indicating that an entry exists for the selected application in the memory associated with the password manager application, retrieving existing password data relating to the selected application;
- code for entering the new password data or the existing password data into the selected application; and
- code for transmitting the new password data or the existing password data over a network to access an online account.

11. A system for obtaining password data for entry to an application running on a mobile device, the system comprising the mobile device configured to run a password manager application, the password manager application configured to:
- identify automatically one or more applications running on the mobile device prior to the password manager application being launched, the identified one or more applications require the password data;
- scan a memory of the mobile device to retrieve data relating to the identified one or more applications;
- display the identified one or more applications on a display of the mobile device based on the retrieved data;
- receive a user selection of a displayed application from the displayed one or more applications;
- obtaining application information for the selected application;
- determine whether an entry exists for the selected application in a memory associated with the password manager application;
- responsive to the determination indicating that no entry exists for the selected application in the memory associated with the password manager application, generate an entry comprising new password data for the selected application using the obtained application information;
- responsive to the determination indicating that an entry exists for the selected application in the memory associated with the password manager application, retrieve existing password data relating to the selected application;
- enter the new password data or the existing password data into the selected application; and
- transmit the new password data or the existing password data over a network to access an online account.

* * * * *